United States Patent
Lin et al.

(10) Patent No.: US 7,814,620 B2
(45) Date of Patent: Oct. 19, 2010

(54) HINGE

(75) Inventors: Ming-Han Lin, Taipei Hsien (TW);
Te-Hung Yin, Taipei Hsien (TW)

(73) Assignee: Cheng Uei Precision Industry Co., Ltd., Taipei Hsien (TW)

( * ) Notice: Subject to any disclaimer, the term of this patent is extended or adjusted under 35 U.S.C. 154(b) by 340 days.

(21) Appl. No.: 12/021,790

(22) Filed: Jan. 29, 2008

(65) Prior Publication Data

US 2009/0188077 A1 Jul. 30, 2009

(51) Int. Cl.
*E05D 11/10* (2006.01)

(52) U.S. Cl. .................. 16/330; 16/284; 16/312

(58) Field of Classification Search ............. 16/243, 16/225–257, 277, 284–285, 295–297, 303, 16/305, 308, 312, 318, 322, 325, 328, 339–342, 16/337
See application file for complete search history.

(56) References Cited

U.S. PATENT DOCUMENTS

| | | | | |
|---|---|---|---|---|
| 1,644,249 A * | 10/1927 | Harrison | ............. | 16/340 |
| 5,109,570 A * | 5/1992 | Okada et al. | ............. | 16/289 |
| 5,109,571 A * | 5/1992 | Ohshima et al. | ............. | 16/307 |
| 5,208,944 A * | 5/1993 | Lu | ............. | 16/278 |
| 5,269,047 A * | 12/1993 | Lu | ............. | 16/340 |
| 5,546,612 A * | 8/1996 | Johnson | ............. | 4/248 |
| 6,175,990 B1 * | 1/2001 | Kato et al. | ............. | 16/334 |
| 6,629,336 B2 * | 10/2003 | Hosaka et al. | ............. | 16/327 |
| 6,817,061 B2 * | 11/2004 | Wu et al. | ............. | 16/308 |
| 6,913,125 B2 * | 7/2005 | Hayashi | ............. | 188/290 |
| 6,920,668 B2 * | 7/2005 | Hayashi | ............. | 16/303 |
| 6,952,860 B2 * | 10/2005 | Kawamoto | ............. | 16/285 |
| 7,007,345 B2 * | 3/2006 | Nakase et al. | ............. | 16/330 |
| 7,082,643 B2 * | 8/2006 | Lu et al. | ............. | 16/340 |
| 7,140,071 B2 * | 11/2006 | Tonogai | ............. | 16/325 |
| 7,143,476 B2 * | 12/2006 | Minami | ............. | 16/340 |
| 7,434,296 B2 * | 10/2008 | Kubota | ............. | 16/330 |
| 7,596,830 B2 * | 10/2009 | Yin et al. | ............. | 16/303 |
| 7,631,397 B2 * | 12/2009 | Yin et al. | ............. | 16/330 |
| 7,653,968 B2 * | 2/2010 | Kubota | ............. | 16/330 |
| 2004/0045130 A1 * | 3/2004 | Kuramochi | ............. | 16/286 |
| 2004/0181909 A1 * | 9/2004 | Kawamoto | ............. | 16/330 |
| 2004/0216275 A1 * | 11/2004 | Hayashi | ............. | 16/303 |
| 2005/0138771 A1 * | 6/2005 | Su | ............. | 16/330 |
| 2005/0188504 A1 * | 9/2005 | Duan et al. | ............. | 16/330 |
| 2007/0039135 A1 * | 2/2007 | Duan et al. | ............. | 16/330 |
| 2010/0000046 A1 * | 1/2010 | Park et al. | ............. | 16/250 |

* cited by examiner

*Primary Examiner*—Robert J Sandy
*Assistant Examiner*—Roberta Delisle
(74) *Attorney, Agent, or Firm*—WPAT, P.C.; Anthony King

(57) ABSTRACT

A hinge includes a hinge assembly and a damper assembly. The damper assembly includes a stationary housing defining a cavity. A damper body rotatablely installed in the cavity has a head protruding to form a cylindrical guiding portion and a pushing portion defining two side ends apart from each other. At least one of the side ends has a step-shaped profile to make the width of the pushing portion between the side ends non-uniform, and rotatable sheets and stationary sheets are received in the cavity and alternately disposed on the guiding portion and the pushing portion. The stationary sheets are fixed to the stationary housing. Each of the rotatable sheets protrudes inwardly to form a retaining portion. The side ends of the pushing portion alternately contact the retaining portions and contact the retaining portions at intervals when the elastic force of the hinge assembly is released to drive the damper body rotating. Damper resin is filled between the adjacent stationary sheets and rotatable sheets.

8 Claims, 5 Drawing Sheets

HINGE

BACKGROUND OF THE INVENTION

1. Field of the Invention

The present invention relates to a hinge, and more particularly to a hinge preferably applicable to a foldable electronic device and capable of gradually opening or closing a cover of the foldable electronic device.

2. The Related Art

As the development of modern mobile communication industry, portable electronic devices such as cellular phones, notebook computers and personal digital assistants etc., become more and more popular. Thereinto, many portable electronic devices have a function of displaying images. In order to display images as distinctly as possible, so screens of the portable electronic devices need to be designed as big as possible. But it is not convenient to carry the portable electronic device with a big screen. That is, the required big screen and the required small size of the portable electronic device are contrary. To solve the problem, foldable electronic devices have been developed. Generally, the foldable electronic device has a cover which is usually used as a screen, and a main body which is joined together with the cover by some types of hinge allowing the cover to be unfolded from the main body.

FIG. 10 shows a conventional hinge used in a foldable electronic device which has a cover and a main body. The hinge includes a cylindrical shaft 700. One end of the shaft 700 is received in a rotatable cam 600 and the other end of the shaft 700 extends to pass through a sliding cam 500, a housing 300 and a cap 200, and is located in the cap 200 through a ring 100. The rotatable cam 600 protrudes downward to form two pushing portions 601 at opposite sides thereof. The sliding cam 500 slideably received in an end of the housing 300 defines two concave grooves 501 receiving the pushing portions 601 respectively. A spring 400 is received in the housing 300 between the sliding cam 500 and the cap 200 plugging an opposite end of the housing 300 and extending toward an inner of the housing 300 and encircles the shaft 700. One end of the spring 400 is fixed on the sliding cam 500, and an opposite end of the spring 400 is mounted on the cap 200. If a user would like to open the foldable electronic device, the user shall firstly unfold the cover from the main body to an angle. The force that the user provides pushes the pushing portions 601 to the top of the concave grooves 501. At the same time, the sliding cam 500 is compelled to slide toward the inner of the housing 300, and then the spring 400 is compressed. Then, the user stops acting on the foldable electronic device, and the elastic force of the spring 400 drives the foldable electronic device opened fully.

However, the movement that the spring 400 releases the elastic force to open the foldable electronic device is quick and uncontrolled, so the impact is produced between the cover and the main body. In this case, the foldable electronic device is easy to be broken or damaged. Thus, a highly reliable hinge is desired to overcome the disadvantage mentioned above.

SUMMARY OF THE INVENTION

Accordingly, an object of the present invention is to provide a hinge preferably applicable to a foldable electronic device and capable of gradually opening/closing the foldable electronic device.

To achieve the above object, the hinge includes a hinge assembly adapted for producing and releasing an elastic force by rotating and a damper assembly connected coaxially with the hinge assembly. The damper assembly includes a stationary housing defining a cavity with an opened end and a wall opposite the opened end. A damper body rotatablely installed in the cavity of the stationary housing has a head, a cylindrical guiding portion axially protruding from the head and a pushing portion radially protruding from a portion of an outer periphery of the guiding portion. The pushing portion has two side ends apart from each other. At least one of the two side ends has a step-shaped profile to make the width of the pushing portion between the two side ends nonuniform, and a plurality of rotatable sheets and a plurality of stationary sheets respectively are received in the cavity of the stationary housing and alternately disposed on the guiding portion and the pushing portion. The stationary sheets are respectively fixed to the stationary housing. Each of the rotatable sheets protrudes inwardly to form a retaining portion. The two side ends of the pushing portion alternately contact the retaining portions and contact the retaining portions at intervals when the elastic force of the hinge assembly is released to drive the damper body rotating to open/close the foldable electronic device. Damper resin is filled between the adjacent stationary sheets and rotatable sheets for restraining the pushing portion rotating.

As described above, the design of the present invention provides the hinge including the damper assembly for restraining the rotation speed of the hinge assembly. Therefore, the foldable electronic device with the hinge can be open/close much more reliably.

BRIEF DESCRIPTION OF THE DRAWINGS

The present invention will be apparent to those skilled in the art by reading the following description of a preferred embodiment thereof, with reference to the attached drawings, in which.

DETAILED DESCRIPTION OF THE PREFERRED EMBODIMENT

Figure 1:
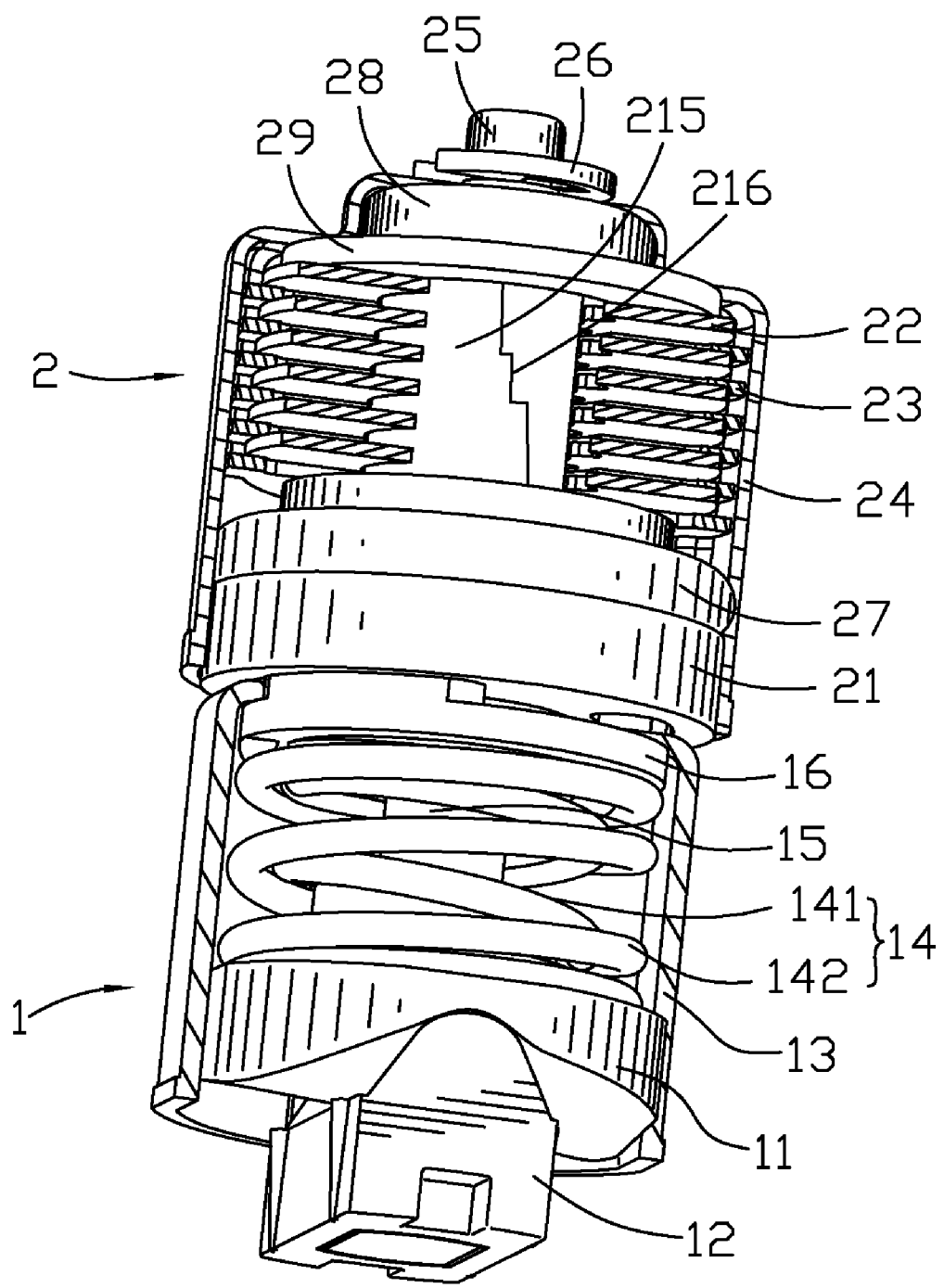
FIG. 1 is a perspective view of a hinge of the present invention which is cut partially for distinctly showing an inner structure thereof.

Referring to FIG. 1, a hinge in accordance with the present invention includes a hinge assembly 1 and a damper assembly 2 coaxially connecting with the hinge assembly 1 to integrally form the hinge.

Figure 2:
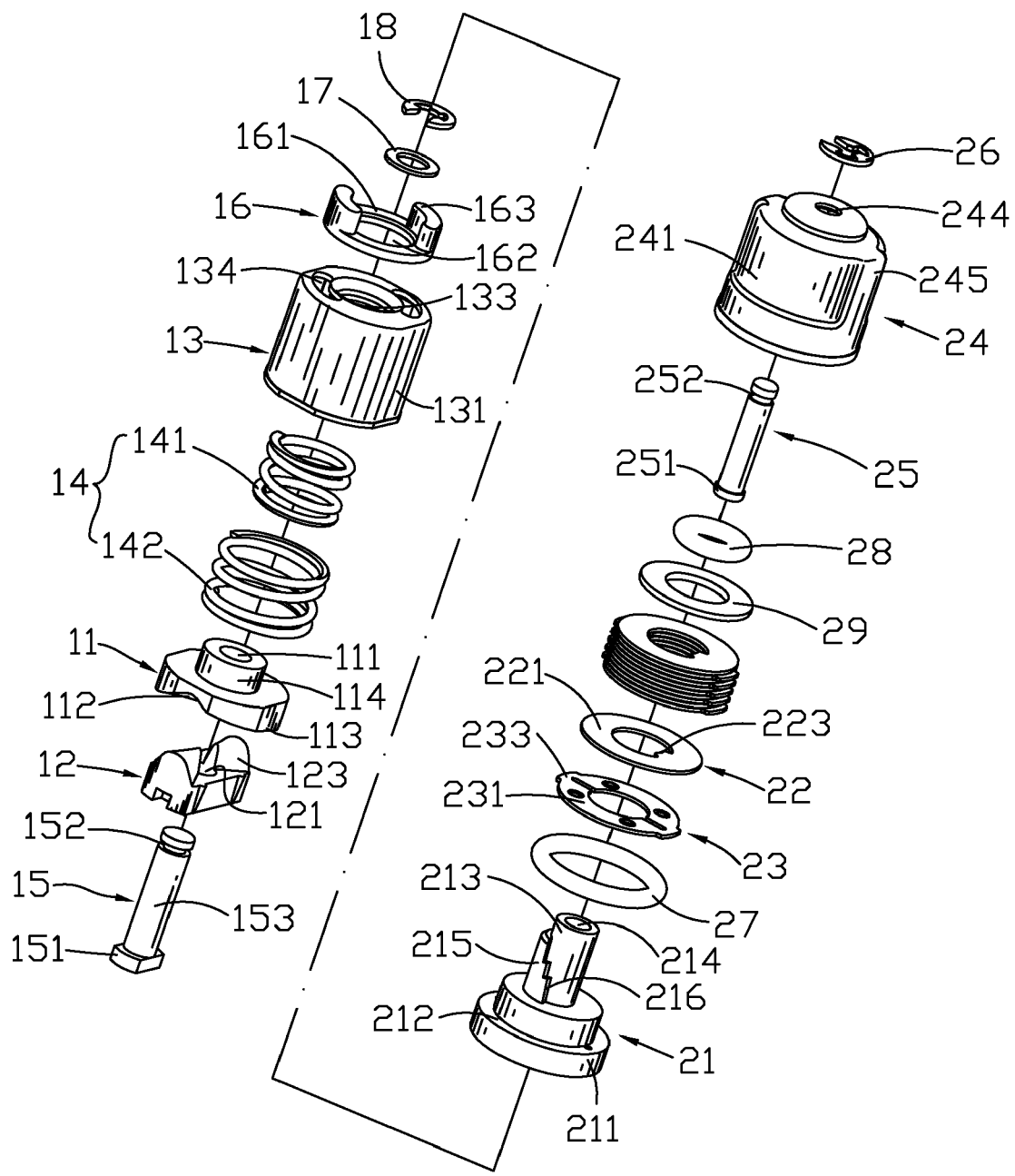
FIG. 2 is an exploded view of the hinge.

Referring to FIG. 2, the hinge assembly 1 includes a sliding cam 11, a cam follower 12, a rotatable housing 13, an elastic member 14, a shaft 15, a connecting member 16, a first washer 17 and a first E-shaped ring 18. All of these will be described in detail hereinafter.

The sliding cam 11 is generally cylindrical in shape and defines a first through hole 111 at center. A front surface of the sliding cam 11 defines a pair of opposite concave recesses 112. Two opposite raised peaks 113 are respectively formed between the concave recesses 112. A rear surface of the sliding cam 11 protrudes to form a cylindrical extending portion 114 at the center thereof, wherein the first through hole 111 passes through the center of the extending portion 114.

Figure 3:
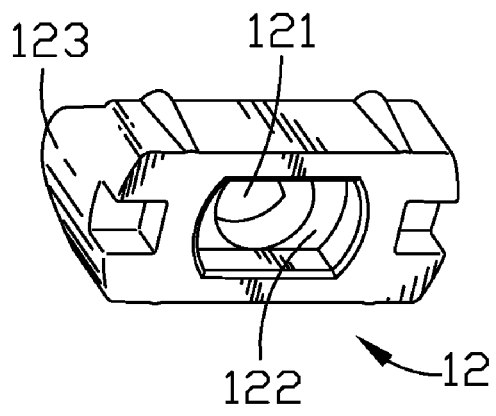
FIG. 3 is a perspective view of a cam follower of the hinge.

With reference to FIG. 2 and FIG. 3, the cam follower 12 is substantially rectangular in shape. The center of the cam follower 12 defines a second through hole 121. A front surface of the cam follower 12 defines a receiving cavity 122 at center. The receiving cavity 122 communicates with the second through hole 121 and outside. A rear surface of the cam follower 12 projects to form two opposite protruding portions 123 at sides thereof. The protruding portions 123 are respectively received in the concave recesses 112 of the sliding cam 11.

Figure 4:
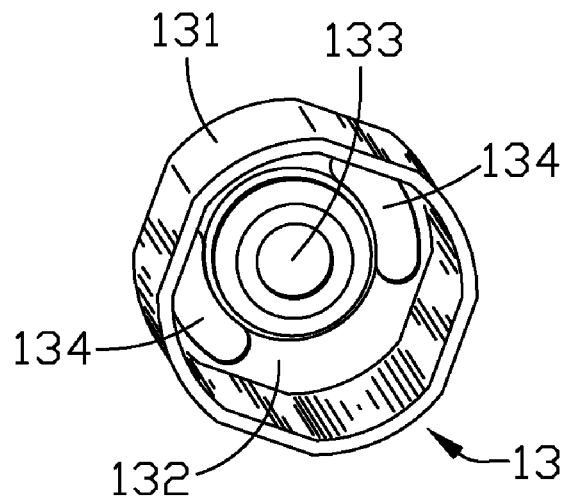
FIG. 4 is a perspective view of a rotatable housing of the hinge.

Please refer to FIG. 2 and FIG. 4. The rotatable housing 13 has a hollow column-shaped fence 131. The fence 131 is partially closed off at a rear end and open at a front end thereof, so the fence 131 has a rear portion 132 at the rear end and the front end of the fence 131 is open and communicates with outside. A third through hole 133 is defined at the center of the rear portion 132 and passes through the rear portion 132. The rear portion 132 defines a pair of opposite slots 134 in arc shape at sides thereof around the third through hole 133.

Referring to FIG. 2 again, the elastic member 14 includes two helical springs named a small spring 141 and a big spring 142 put around the small spring 141.

The shaft 15 has a cylindrical main body 153. A limiting portion 151 is integrally joined with a front end of the main body 153. The diameter of the limiting portion 151 is greater than the diameter of the main body 153. A rear end of the main body 153 defines a first fixing notch 152 therearound.

The connecting member 16 has a circular basic body 161. An aperture 162 passes through the center of the basic body 161. A rear surface of the basic body 161 extends to form a pair of opposite connecting portions 163 at sides thereof. The connecting portions 163 are arc-shaped and around the aperture 162.

Please refer to FIG. 1 and FIG. 2. While the hinge assembly 1 is assembled, the sliding cam 11 is slideably installed in the front end of the rotatable housing 13. The extending portion 114 protrudes to an inner of the rotatable housing 13. The connecting member 16 is fixed in the rear end of the rotatable housing 13 and the basic body 161 of the connecting member 16 is attached to the rear portion 132 of the rotatable housing 13. The connecting portions 163 are inserted in the slots 134 respectively and stretch out of the slots 134. The elastic member 14 is received in the rotatable housing 13 and disposed between the sliding cam 11 and the connecting member 16. Ends of the small spring 141 and the big spring 142 are pressed against the basic body 161 of the connecting member 16 and opposites ends of the small spring 141 and the big spring 142 are pressed against the rear surface of the sliding cam 11 and encircle the extending portion 114 of the sliding cam 11. The cam follower 12 mates with the sliding cam 11. The protruding portions 123 of the cam follower 12 are respectively received in the concave recesses 112 of the sliding cam 11. The shaft 15 passes through the cam follower 12, the sliding cam 11, the elastic member 14, the rotatable housing 13 and the connecting member 16 in turn. The main body 153 of the shaft 15 is received in the second through hole 121, the first through hole 111, the small spring 141 and the big spring 142, the third through hole 133 and the aperture 162. The limiting portion 151 is located in the receiving cavity 122 of the cam follower 12. The rear end of the main body 153 of the shaft 15 stretches out of the rotatable housing 13 and is exposed outside. The rear end of the main body 153 passes through the center of the first washer 17 and is fixed together with the rotatable housing 13 through the first E-shaped ring 18 inserted in the first fixing notch 152 of the shaft 15.

Referring to FIG. 2, the damper assembly 2 includes a damper body 21, a plurality of rotatable sheets 22, a plurality of stationary sheets 23, a stationary housing 24, a center pin 25, a second E-shaped ring 26, a first O-shaped ring 27, a second O-shaped ring 28 and a second washer 29. All of these will be described in detail hereinafter.

Figure 6:
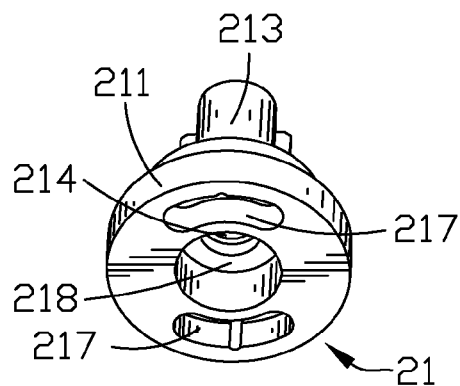
FIG. 6 is a perspective view of a damper body of the hinge.
Figure 7:
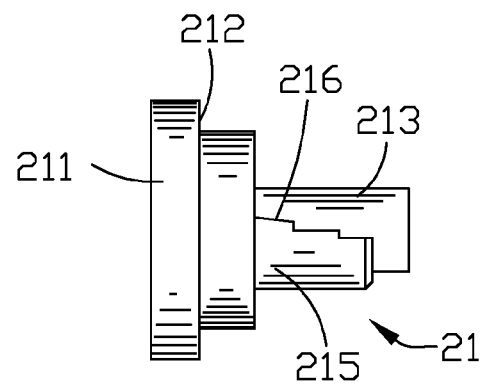
FIG. 7 is another perspective view of the damper body.

With reference to FIG. 6 and FIG. 7, the damper body 21 has a discoid head 211. A rear surface of the discoid head 211 defines a mounting recess 212 therearound. The center of the rear surface of the discoid head 211 axially protrudes rearward to form a cylindrical guiding portion 213 and a pushing portion 215 radially protruding from the rear surface of the discoid head 211 and attached on an outer periphery of the guiding portion 213. The pushing portion 215 is of open ring-shape and has two opposite side ends 216 apart from each other. Each of the two side ends 216 has a step-shaped profile to make the width of the pushing portion 215 between the two side ends 216 diminish gradually from front to rear. A first central hole 214 is defined to pass through the center of the discoid head 211 and the guiding portion 213. A front surface of the discoid head 211 defines an accommodating recess 218 at center. The accommodating recess 218 communicates with the first central hole 214 and outside. The diameter of the accommodating recess 218 is greater than the diameter of the first central hole 214. Two opposite locating grooves 217 are respectively defined at sides of the front surface of the discoid head 211 and around the accommodating recess 218.

Figure 8:
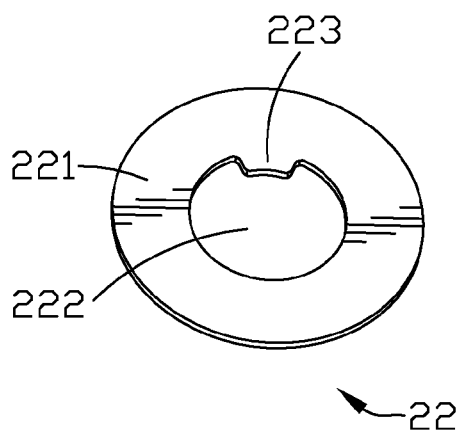
FIG. 8 is a perspective view of a rotatable sheet of the hinge.
Figure 9:
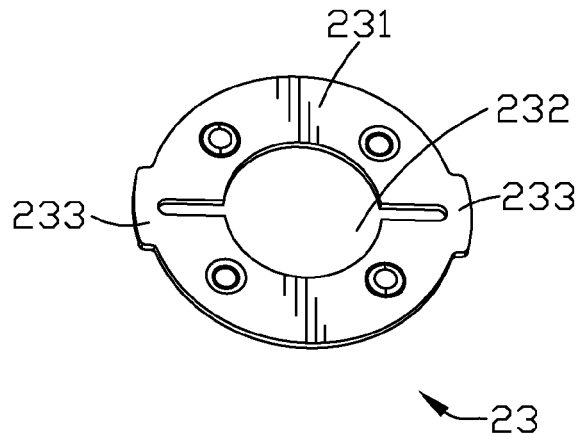
FIG. 9 is a perspective view of a stationary sheet of the hinge.
Figure 10:
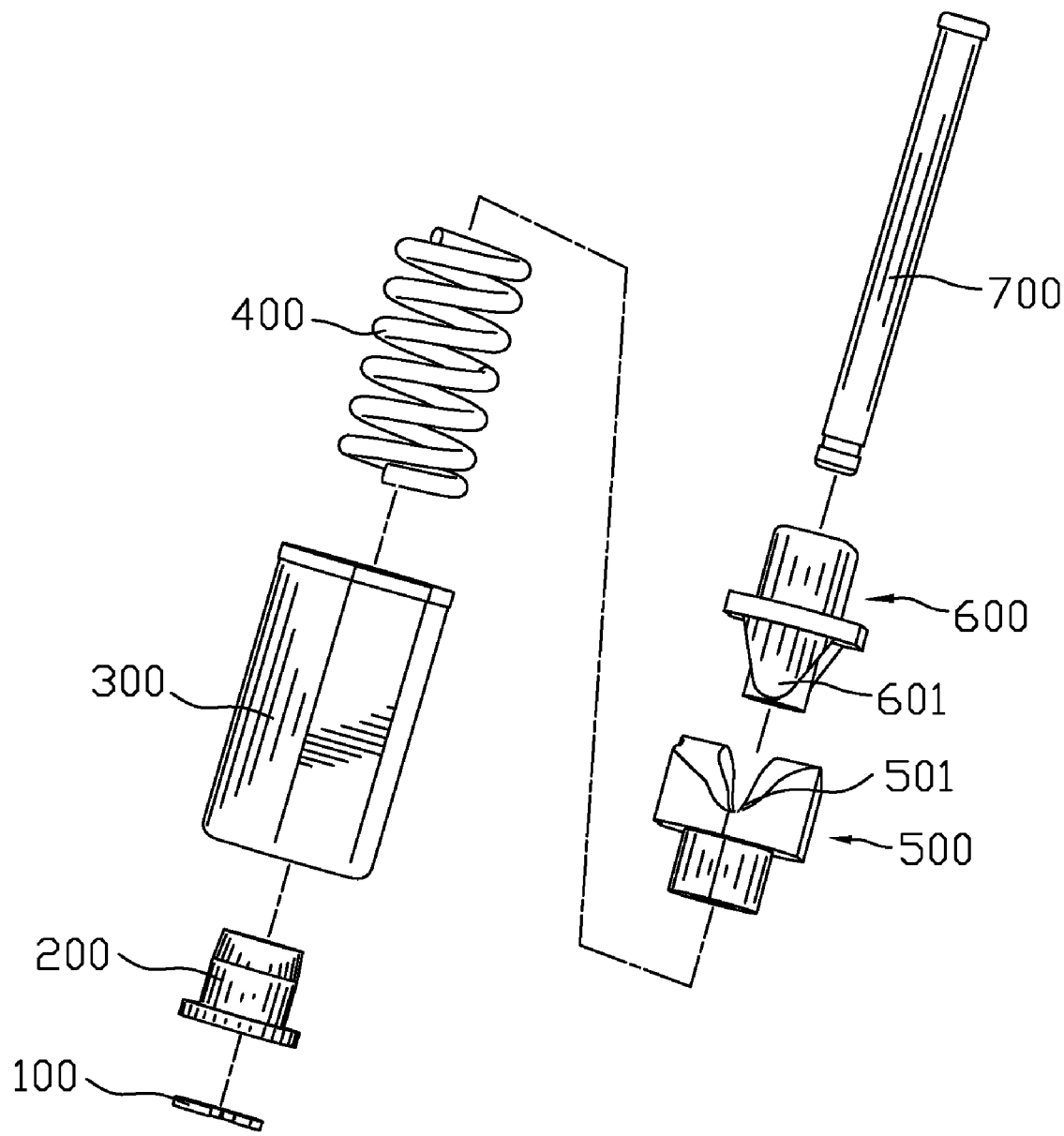
FIG. 10 is an exploded view of a prior hinge.

Referring to FIG. 2, FIG. 8 and FIG. 9, the rotatable sheet 22 has a circular rotatable portion 221. The center of the rotatable portion 221 defines a first circular receiving hole 222. The rotatable portion 221 protrudes to an inner of the first receiving hole 222 to form a retaining portion 223. The stationary sheet 23 has a circular stationary portion 231. The center of the stationary portion 231 defines a second circular receiving hole 232. Two opposite locating portions 233 protrude outward from sides of the stationary portion 231.

Figure 5:
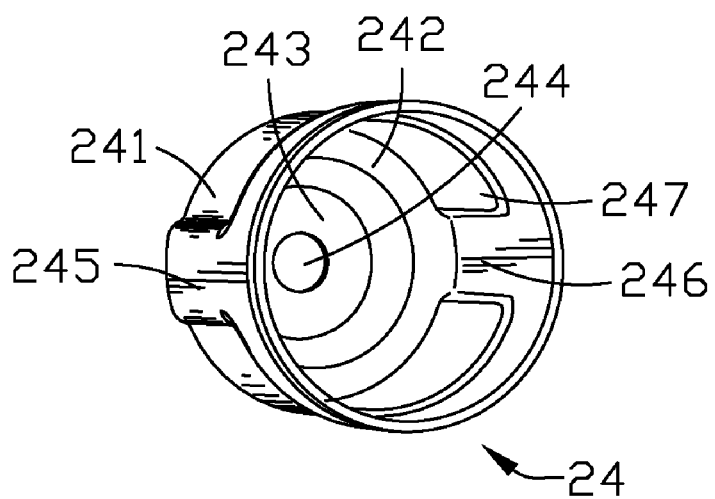
FIG. 5 is a perspective view of a stationary housing of the hinge.

With reference to FIG. 2 and FIG. 5, the stationary housing 24 has a cylindrical enclosure 241. The enclosure 241 is partially closed off at a rear end and open at a front end thereof. Then a rear wall 242 is defined to seal the rear end of the enclosure 241. The center of the rear wall 242 hollows rearward to form a concave cavity 243. A second central hole 244 is defined at the center of the rear wall 242 and passes through the rear wall 242 and the concave cavity 243. An inner surface of the enclosure 241 protrudes inward to form an annular clipping portion 247 adjacent to the rear wall 242. Two opposite fixing grooves 246 are defined at sides of the clipping portion 247 and axially pass through the clipping portion 247. An outer surface of the enclosure 241 axially protrudes outward to form two strips of opposite settling portions 245 at sides thereof for fixing the stationary housing 24.

Referring to FIG. 2, the center pin 25 includes a flange 251 at one end thereof. The other end of the center pin 25 defines a second fixing notch 252 therearound.

With reference to FIG. 1 and FIG. 2, in assembly of the damper assembly 2, the damper body 21 is rotatablely installed in the front end of the stationary housing 24. The guiding portion 213 of the damper body 21 extends to be received in the concave cavity 243 and against the rear wall 242 of the stationary housing 24. The rotatable sheets 22 and the stationary sheets 23 are alternately received in the stationary housing 24 and surrounded by the clipping portion 247, wherein every adjacent rotatable sheet 22 and stationary sheet 23 are attached to each other and the rotatable sheets 22 are rotatablely received in the stationary housing 24. The locating portions 233 of the stationary sheets 23 are located in the fixing grooves 246 respectively. The first receiving holes 222 of the rotatable sheets 22 and the second receiving holes 232 of the stationary sheets 23 receive the guiding portion 213 and the pushing portion 215 of the damper body 21. The rotatable sheets 22 and the stationary sheets 23 are placed between the rear surface of the discoid head 211 and the second washer 29 disposed on the guiding portion 213 of the damper body 21 and received in the rear end of the stationary housing 24. The first O-shaped ring 27 is disposed in the mounting recess 212. The second O-shaped ring 28 is disposed on the guiding portion 213 behind the second washer 29 and received in the concave cavity 243. The center pin 25 passes through the first central hole 214 of the damper body 21, the first O-shaped ring 27, the second receiving holes 232 of the stationary sheets 23, the first receiving holes 222 of the rotatable sheets 22, the second washer 29, the second O-shaped ring 28 and the second central hole 244 of the stationary housing 24. The flange 251 of the center pin 25 is fixed in the accommodating recess 218 of the damper body 21. The second fixing notch 252 is exposed out of the second central hole 244 of the stationary housing 24 and the center pin 25 is fastened together with the stationary housing 24 through the second E-shaped ring 26 inserted in the second fixing notch 252. The connecting portions 163 of the hinge assembly 1 are disposed in the locating grooves 217 of the damper body 21 of the damper assembly 2, and then the hinge assembly 1 and the damper assembly 2 are assembled together. In a preferred embodiment of the present invention, damper resin is filled between the adjacent rotatable sheets 22 and the stationary sheets 23. The first O-shaped ring 27 and the second O-shaped ring 28 prevent the damper resin leakage.

Please refer to FIG. 1 and FIG. 2. In use, the hinge is assembled on a foldable electronic device including a cover and a main body (not shown). The rotatable housing 13 is configured on the cover and the cam follower 12 and the stationary housing 24 are configured on the main body in the preferred embodiment.

When a user wants to open/close the foldable electronic device, the user firstly opens/closes the cover from/to the main body partly. The force the user provides drives the rotatable housing 13 rotating. Because the sliding cam 11 is slideably installed in the rotatable housing 13, the sliding cam 11 follows the rotatable housing 13 to rotating. Then the protruding portions 123 of the cam follower 12 rises on the raised peaks 113 of the sliding cam 11 from the concave recesses 112 defined on the sliding cam 11. Then the sliding cam 11 is driven sliding into the inner of the rotatable housing 13. The small spring 141 and the big spring 142 of the elastic member 14 are compressed. At the same time, the connecting portions 163 of the connecting member 16 inserted in the slots 134 of the rotatable housing 13 and further the locating grooves 217 of the damper body 21 for connecting the hinge assembly 1 and the damper assembly 2 brings the damper body 21 rotating. The guiding portion 213 and the pushing portion 215 of the damper body 21 rotate in the first receiving holes 222 of the rotatable sheets 22 and the second receiving holes 232 of the stationary sheets 23. When the protruding portions 123 of the cam follower 12 begin sliding in the concave recesses 112 from the raised peaks 113 of the sliding cam 11, the user stops acting on the cover of the foldable electronic device. The elastic force stored in the small spring 141 and the big spring 142 drives the rotatable housing 13 rotating continually. So the connecting portions 163 of the connecting member 16 bring the damper body 21 rotating continually until the foldable electronic device is open/close fully. At the time of the protruding portions 123 beginning sliding in the concave recesses 112 from the raised peaks 113, the two side ends 216 of the pushing portion 215 alternately contact the retaining portions 223 and contact the retaining portions 223 of the rotatable sheets 22 one by one when the elastic force of the small spring 141 and the big spring 142 is released to drive the damper body 21 rotating to open/close the foldable electronic device. Because the damper resin is filled between the adjacent rotatable sheets 22 and stationary sheets 23, the rotation speed of the pushing portion 215 is restrained. Then the damper assembly 2 restrains the rotation speed of the hinge assembly 1. Therefore, the cover is open/close from/to the main body of the foldable electronic device smoothly and securely.

As described above, the design of the present invention provides the hinge including the damper assembly 2 for restraining the rotation speed of the hinge assembly 1. Therefore, the foldable electronic device with the hinge can be open/close much more reliably.

The foregoing description of the present invention has been presented for purposes of illustration and description. It is not intended to be exhaustive or to limit the invention to the precise form disclosed, and obviously many modifications and variations are possible in light of the above teaching. Such modifications and variations that may be apparent to those skilled in the art are intended to be included within the scope of this invention as defined by the accompanying claims.

What is claimed is:

1. A hinge applicable to a foldable electronic device, comprising:
   a hinge assembly adapted for producing and releasing an elastic force by rotating; and
   a damper assembly connected coaxially with the hinge assembly, the damper assembly including:
      a stationary housing defining a cavity with an opened end and a wall opposite the opened end,
      a damper body rotatablely installed in the cavity of the stationary housing, the damper body having a head, a cylindrical guiding portion axially protruding from the head and a pushing portion radially protruding from a portion of an outer periphery of the guiding portion, the pushing portion having two side ends apart from each other, at least one of the two side ends having a step-shaped profile to make the width of the pushing portion between the two side ends nonuniform, an outside surface of an outside step of the step-shaped side end being inclined inwardly from one end thereof away from other steps of the step-shaped side end towards the other end thereof adjacent to the other steps, outside surfaces of the other steps being in the same direction with the axis direction of the damper body, and
      a plurality of rotatable sheets and a plurality of stationary sheets respectively received in the cavity of the stationary housing and alternately disposed on the guiding portion and the pushing portion, the stationary sheets being fixed to the stationary housing, each of the rotatable sheets protruding inwardly to form a retaining portion, when the elastic force of the hinge assembly is released to drive the damper body to rotate to open the foldable electronic device, one side end of the pushing portion contacting one end of the retaining portions in succession because of change of the width of the pushing portion in order to open the foldable electronic device gently, when the elastic force of the hinge assembly is released to drive the damper body to rotate to close the foldable electronic device, the other side end of the pushing portion contacting the other end of the retaining portions in succession because of change of the width of the pushing portion in order to open the foldable electronic device gently, damper resin being filled between the adjacent stationary sheets and rotatable sheets for restraining the pushing portion rotating.

2. The hinge as claimed in claim 1, wherein the two side ends of the pushing portion both have a step-shaped profile.

3. The hinge as claimed in claim 1, wherein the pushing portion is of open ring-shape.

4. The hinge as claimed in claim 1, further comprising a washer received in the cavity of the stationary housing and disposed on the guiding portion for insulating the rotatable sheets and the stationary sheets from the wall of the stationary housing.

5. The hinge as claimed in claim 1, wherein the head of the damper body defines a mounting recess therearound, a ring is disposed in the mounting recess to prevent the damper resin leakage.

6. The hinge as claimed in claim 1, wherein the head of the damper body defines a first central hole passing through the guiding portion, the wall of the stationary housing axially defines a second central hole passing therethrough, a center pin passes through the first central hole and the second central hole and is fixed together with the wall of the stationary housing.

7. The hinge as claimed in claim 6, wherein an inside of the wall is concaved to form a concave cavity, a ring is received in the concave cavity and disposed on the guiding portion to prevent the damper resin leakage.

8. A hinge applicable to a foldable electronic device, comprising:
a hinge assembly adapted for producing and releasing an elastic force by rotating; and
a damper assembly connected coaxially with the hinge assembly, the damper assembly including:
a stationary housing defining a wall at an end thereof and opening at an opposite end thereof,
a damper body rotatablely installed in the stationary housing, the damper body having a head, the head protruding to form a pushing portion which two side ends apart from each other, at least one of the two side ends having a step-shaped profile to make the width of the pushing portion between the two side ends non-uniform, an outside surface of an outside step of the step-shaped side end being inclined inwardly from one end thereof away from other steps of the step-shaped side end towards the other end thereof adjacent to the other steps, outside surfaces of the other steps being in the same direction with the axis direction of the damper body, and
a plurality of rotatable sheets and a plurality of stationary sheets respectively received in the stationary housing and alternately disposed on the pushing portion, the stationary sheets being fixed to the stationary housing, each of the rotatable sheets protruding inwardly to form a retaining portion, when the elastic force of the hinge assembly is released to drive the damper body to rotate to open the foldable electronic device, one side end of the pushing portion contacting one end of the retaining portions in succession because of change of the width of the pushing portion in order to open the foldable electronic device gently, when the elastic force of the hinge assembly is released to drive the damper body to rotate to close the foldable electronic device, the other side end of the pushing portion contacting the other end of the retaining portions in succession because of change of the width of the pushing portion in order to open the foldable electronic device gently, damper resin being filled between the adjacent stationary sheets and rotatable sheets for restraining the pushing portion rotating.

\* \* \* \* \*